Patented Mar. 3, 1942

2,275,087

UNITED STATES PATENT OFFICE 2,275,087

PROCESS OF MAKING BUILDING BLOCKS

Clinton W. Murchison, Dallas, Tex.

No Drawing. Application September 13, 1941, Serial No. 410,773

5 Claims. (Cl. 25—156)

This invention relates to a process of making building blocks, and more particularly to building blocks of the type employing emulsified bitumens, asphalts, tars, pitches, and the like, in their manufacture, the term "emulsified bitumen" being used in this description and the claims appended hereto to denote such substances. For definitions of such substances, reference is made to the "Standard Definitions of Terms Relating to Materials for Roads and Pavements" of the American Society for Testing Materials ASTM Designation D8-33.

It has been proposed heretofore to manufacture building blocks by hand molding mechanical mixtures of soil, water, and emulsified bitumen. Such prior proposals have been unsatisfactory in that only certain types of soil have been capable of use, the resultant blocks have been crude and rough in appearance, and a period of 25 to 30 days has been necessary to dry the blocks before they are capable of use. The processes heretofore proposed have been confined to working in the cold and in the absence of pressure, no thought having apparently been given to the possibilities of the use of heat and pressure at certain stages in the process.

In improving both the prior products and processes, it is a major object of my invention to provide a novel process of making a building block of the so-called emulsified bitumen type that may be dried and used in building 24 hours after it is molded.

A further object of my invention is the provision of a novel building block of the emulsified bitumen type having smooth surfaces, uniform shape, greater hardness, and higher compressive strength than previous blocks of this type, and an absence or reduction of shrinkage cracks.

Still a further object of my invention is the provision of a novel process for manufacturing building blocks of the emulsified bitumen type wherein the emulsified bitumen is broken down at a stage and under conditions wherein the most uniform and effective binding therefrom can be secured, the water from the emulsion being simultaneously employed to secure the material benefit from water hardening. Because of the utilization of the water from the emulsion for water hardening, it has been found necessary to add only a very small quantity of water in the cases of some soils, and none with others, thereby facilitating the drying of the molded product.

Further objects and advantages of my invention will appear from the following description and claims.

In practicing my invention, the soil to be used is preferably tested and blended with other soils, if necessary, to produce a soil of a definite plasticity index, reference being made to the definitions in the "Standard Specifications for Highway Materials and Methods of Sampling and Testing" published by The American Association of State Highway Officials at Washington, D. C. in 1938.

This is necessary as the soils in different parts of the country have different physical characteristics. Preferably the soil is blended such that there is approximately 30 percent to 80 percent particles of colloidal size, i. e., 0.005 mm., such as is characteristic of clay, a major proportion of such colloidal sized particles being desired. Where in prior processes over 25 percent of such particles have been regarded as deleterious, I have found that a larger proportion of such particles is an advantage because of their ability to mix more intimately with and more firmly bind with the asphalt to produce blocks of a very hard character. The necessity for blending can readily be determined by a mechanical analysis of the soil, as by hydrometer analysis of particle size, or by experimenting with different proportions of the soil, water, and emulsified bitumen.

Ordinarily it is necessary to add only a small amount of water to the soil at this stage, it being desirable to bring it only to a plastic state. With some soils, it has been found unnecessary to add any water.

The plastic soil is then mixed with a predetermined proportion of emulsified bitumens, tars, pitches, and the like, preferably emulsified asphalt, such as the typical asphalt emulsion used in soil stabilization by a number of state highway departments including the State Highway Department of Texas and meeting their specifications EA10S and EA9SS-1.

The proportion of emulsified bitumen added, as, for instance, emulsified asphalt of the above types, is approximately 6 percent to 9 percent by weight.

Shrinkage and cracking of the blocks during drying is minimized by insuring that the moisture content of the mass during the molding stage is approximately at the shrinkage limit, and by insuring that the mass is compacted, as hereinafter described.

The soil with its water content and the emulsified bitumen are mechanically mixed in a suitable mixer, such as a pug mill. Preferably a knife machine of the type used in brick or tile machines is employed because of its ability to be used in a continuous process.

After sufficient mixing to insure that the water content of the soil is uniform, the mixture is preferably fed into an extrusion machine or mill of the auger or screw type, the conduit thereof being about three feet long and terminating in a die of the desired shape. By reason of the pressure created by the screw and the self-induced or additional heat developed by frictional energy, the temperature of the mixture rises to a point in excess of that necessary to break or revert the emulsion, the approximate temperature being about 180 degrees F. to 245 degrees F., depending on the rate of operation of the mill, or the speed of rotation of the auger or screw. A pressure of about 200 pounds per square inch as a minimum has been found satisfactory. At times the temperature rises to such an extent that the extruded material emerges hissing because of the rapid vaporization of the water content.

As a result of the breaking of the emulsion and the pressure of the screw which compacts the mixture to the desired density, the freed asphalt coats each of the individual soil particles uniformly, this resulting in a uniform binding and a uniform color in the resultant product. At the same time, the water released from the emulsion enters into the mixture and is uniformly distributed to effect subsequent water hardening of the soil. Such hardening is characteristic of a mixture of soil such as clay with water that is subsequently dried.

The gas and vapor that would otherwise remain in the mixture and cause undesirable vapor pockets tend to return to the entrance end of the conduit, or the point of least pressure, and there escape.

In the continued operation of the screw, the mixture which is just sufficiently plastic to be extruded, is extruded through the die and cut into blocks of the desired size. The material is sufficiently hard at this stage that blocks three feet long can be picked up at the ends and handled with no danger of breaking or bending of the block.

If desired, the die can be shaped to form one or more bores in the block to make them hollow. These bores aid in dehydration and shrinkage control, and provide dead air spaces in the finished wall. The bores also furnish convenient gripping means in handling the blocks.

The molded blocks are then removed to a drying station where they are stacked and dried under controlled conditions, too rapid drying being undesirable. Controlled drying can be secured by placing the blocks in the shade, or in a humidified atmosphere for a period of about 24 hours, after which the blocks are ready for use as building material.

In building with the blocks, cement mortar of the usual type may be employed. However, it is preferable to use mortar of the same type as the mixture from which the blocks are made, as this type of mortar has been found to more readily combine with the material in the blocks and form in effect a solid homogeneous mass, highly resistant to weathering, and of great strength.

In lieu of an auger or screw type machine, I may use a press, the only controlling factor being that sufficient heat and pressure must be developed to break the emulsion and at the same time insure the uniform distribution of the freed asphalt and water throughout the soil.

As a typical example of practicing the present invention, it has been found that excellent blocks can be produced by using soil occurring in the southern part of Dallas County, Texas, which is a typical red clay. In one case, the soil employed had a particle size as follows:

|  | Percent by weight |
|---|---|
| Total percent finer than | |
| 100 mesh standard sieve | 100 |
| 200 mesh standard sieve | 95 |
| 0.005 mm. particle size (determined by AASHO hydrometer analysis) | 80 |

To 91 parts by weight of this soil, 9 parts of emulsified bitumen were added, the latter consisting of about 40 percent water and the emulsifying agent, and about 60 percent asphalt by weight, this emulsion being secured from the Talco Asphalt and Refining Company of Mt. Pleasant, Texas, and meeting specification EA10S of the State Highway Department of Texas.

This mixture was then processed, molded, and dried as previously described.

In another mix, soil from the same part of Texas was used with a particle size as follows:

|  | Percent by weight |
|---|---|
| Total percent finer than | |
| 50 mesh standard sieve | 100 |
| 100 mesh standard sieve | 80 |
| 200 mesh standard sieve | 55 |
| 0.005 mm. particle size (determined by AASHO hydrometer analysis) | 32 |

To this soil, emulsified bitumen of the same type described in the foregoing example was added in the proportion of 94 parts of soil to 6 parts of emulsion by weight, the resultant mixture being similarly processed, molded, and dried.

In both the above instances, the moisture present in the soil was found sufficient, and it was not necessary to add any water to either mix.

The blocks so made have been found to have a compressive strength of over 90 pounds per square inch, and are capable of taking and holding nails, which is highly desirable in building.

Blocks of the type herein described may be molded in suitable shapes, such as bricks to form side walls and flooring, and tiles to form roofs.

The invention herein described has been found to be of special value in localities such as Texas, where suitable soil has been found to be readily available. With a process of the type herein described and by employing a portable machine, the blocks to go into a building, such as a house or a barn, can be quickly manufactured on the premises and be available for building in 24 hours. This rapid drying is a decided advantage in that it avoids the necessity for excessive space in drying the blocks, and enables the builder of the house or barn to set to work 24 hours after the manufacture of bricks is begun, and be assured of an adequate supply as the building proceeds.

The blocks of the present invention are especially adaptable in a military way for the building of field fortifications wherein time is an essential factor. The blocks can readily be made by portable machinery from soil at the position of the fortification, thus avoiding the necessity for the transportation of a major quantity of material.

The previously described ability in the present invention to use soils of higher colloidal content than have hitherto been considered possible is of great advantage in that it allows of a greater selectivity of soils and results in a much harder and better appearing block. Such blocks have surfaces capable of readily taking paint, plaster, and other types of finishes.

The resultant physical structure of the block has been found to include a series of fiber-like layers. When a screw type of ejector is used, such layers have been found to be of spiral shape, thereby increasing the strength of the block far above the strength of the former hand molded blocks.

It is to be understood that the invention may be embodied in specific forms other than that illustrated without departing from the principle or essential characteristics thereof. The embodiments shown are therefore to be considered as illustrative and not restrictive, the scope of the invention being defined by the appended claims rather than the foregoing description. All modifications and changes which come within the meaning and range of equivalency of the claims are therefore intended to be included therein.

I claim:

1. A process of manufacturing building blocks, comprising the steps of mixing emulsified bitumen, soil and water in predetermined proportions, extruding the mixture to form blocks under sufficient heat and pressure to expel gas and vaporize the water, and finally drying the blocks for about twenty-four hours after such extrusion to cause rapid hardening of said blocks.

2. A process of manufacturing building blocks, comprising the steps of mixing emulsified bitument, soil and water in predetermined proportions, the major portion of the soil consisting of particles of colloidal size, extruding the mixture in the form of blocks under sufficient heat and pressure to expel gas and vaporize the water, and finally drying the blocks for about twenty-four hours after such extrusion to cause rapid hardening of said blocks.

3. A process of manufacturing building blocks, comprising the steps of mixing emulsified bitument, soil and water in predetermined proportions, said soil being plasticized by the water and consisting of particles sufficiently small to pass a 50 mesh standard sieve, at least eighty percent of said particles being sufficiently small to pass a 100 mesh standard sieve, fifty-five percent or upward a 200 mesh standard sieve, and thirty-two percent or upward having a particle size of substantially 0.005 mm., said percentages being taken by weight, extruding the mixture to form blocks under sufficient heat and pressure to expel gas and vaporize the water, and finally drying the blocks for about twenty-four hours after such extrusion to cause rapid hardening of said blocks.

4. A process of manufacturing building blocks, comprising the steps of mixing emulsified bitumen, soil and water in predetermined proportions, the soil containing between thirty-two percent and eighty percent particles of colloidal size (AASHO hydrometer analysis) and the water being present in sufficient quantity to plasticize the soil, extruding the mixture to form blocks under sufficient heat and pressure to expel gas and vaporize the water, and finally drying the blocks for about twenty-four hours after such extrusion to cause rapid hardening of said blocks.

5. A process of manufacturing building blocks which will rapidly harden in a final drying step at substantially atmospheric temperature, comprising mixing emulsified bitumen, soil and water in the proportion of approximately one hundred parts by weight of soil and six to nine parts by weight of emulsified bitumen, and water sufficient in amount to plasticize the soil, then extruding the mixture in block form under a pressure and temperature sufficiently high to break the emulsion and cause rapid vaporization of the water content of the mixture, and finally drying the blocks under substantially atmospheric temperature conditions.

CLINTON W. MURCHISON.